(12) United States Patent
Stephens et al.

(10) Patent No.: US 7,483,994 B1
(45) Date of Patent: Jan. 27, 2009

(54) SYSTEM AND METHOD FOR CREATING A STANDARD ENVELOPE STRUCTURE

(75) Inventors: Michael Clifford Stephens, Stillwater, MN (US); Rae Dean M. Walby, New Hope, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 694 days.

(21) Appl. No.: 11/160,094

(22) Filed: Jun. 8, 2005

Related U.S. Application Data

(60) Provisional application No. 60/624,377, filed on Nov. 1, 2004.

(51) Int. Cl.
*G06F 15/16* (2006.01)
*G06F 7/00* (2006.01)

(52) U.S. Cl. .................. 709/230; 709/204; 709/228; 707/103 R; 707/1

(58) Field of Classification Search .................. 709/230, 709/204, 228; 707/1, 103 R
See application file for complete search history.

(56) References Cited

U.S. PATENT DOCUMENTS

| | | | |
|---|---|---|---|
| 5,974,449 A | 10/1999 | Chang et al. | |
| 6,457,066 B1 | 9/2002 | Mein et al. | |
| 6,735,621 B1 | 5/2004 | Yoakum et al. | |
| 6,757,899 B2 | 6/2004 | Zhdankin et al. | |
| 6,772,216 B1 | 8/2004 | Ankireddipally et al. | |
| 6,782,542 B1 | 8/2004 | Mein et al. | |
| 7,069,335 B1 * | 6/2006 | Layman et al. | 709/238 |
| 2002/0032790 A1 | 3/2002 | Linderman | |
| 2002/0046239 A1 | 4/2002 | Stawikowski et al. | |
| 2002/0056012 A1 * | 5/2002 | Abileah et al. | 709/310 |
| 2002/0107992 A1 | 8/2002 | Osbourne et al. | |
| 2002/0199182 A1 | 12/2002 | Whitehead | |
| 2003/0018720 A1 | 1/2003 | Chang et al. | |
| 2003/0081791 A1 | 5/2003 | Erickson et al. | |
| 2003/0110167 A1 | 6/2003 | Kim | |
| 2003/0135628 A1 | 7/2003 | Fletcher et al. | |
| 2003/0172110 A1 | 9/2003 | Kunisetty | |
| 2004/0010496 A1 | 1/2004 | Behrendt et al. | |
| 2004/0019645 A1 | 1/2004 | Goodman et al. | |
| 2004/0045005 A1 | 3/2004 | Karakashian | |
| 2004/0054690 A1 | 3/2004 | Hillerbrand et al. | |
| 2004/0122892 A1 | 6/2004 | Brittenham et al. | |
| 2004/0162873 A1 | 8/2004 | Kojima et al. | |
| 2007/0256080 A1 * | 11/2007 | Smith et al. | 719/313 |

OTHER PUBLICATIONS

Soap Version 1.2 Part 1: Messaging Framework Jun. 24, 2003 World Wide Web Consortium (W3C Recommendation) http://www.w3.org/TR/2003/REC-soap12-part1-20030624/.*

* cited by examiner

*Primary Examiner*—Kevin Bates
*Assistant Examiner*—Brandon Wilgor
(74) *Attorney, Agent, or Firm*—Snell & Wilmer L.L.P.

(57) ABSTRACT

A system and method for expanding the capabilities of a SOAP envelope to include information useful for processing messages between a requestor and provider is disclosed. The message structure defines seven standard header blocks; each defined to provide data specific to a common infrastructure capability of an enterprise messaging infrastructure. Additionally, standard header blocks are included within a message envelope to preserve data when a transformation occurs such as, for example, alternating between transport protocols or converting the message language.

50 Claims, 4 Drawing Sheets

US 7,483,994 B1

SYSTEM AND METHOD FOR CREATING A STANDARD ENVELOPE STRUCTURE

CROSS-REFERENCE TO RELATED APPLICATIONS

This application claims priority to, and the benefit of, U.S. Provisional Application Ser. No. 60/624,377, filed Nov. 1, 2004, and entitled "Message Structure", which is hereby incorporated by reference.

FIELD OF INVENTION

The invention generally relates to creating messages within a defined envelope structure encompassing a plurality of data blocks, wherein each of the data blocks are defined to meet the needs of specific infrastructure capabilities common to component messaging, and more particularly, to providing a framework for physical transformations of messages to allow loose coupling of components within a heterogeneous computing environment.

BACKGROUND OF INVENTION

A typical web service is a piece of software that uses a standardized XML messaging system to make it available over the Internet. Specifically, a web service typically comprises a collection of functions that are packaged as a single entity and published to a network for use by other programs through XML based messages, wherein the XML based messages are exchanged via Internet based protocols. According to the Object Oriented (OO) architecture, applications exchange messages using Remote Procedure Calls (RPC) between various objects such as, for example, Distributed Component Object Model (DCOM) and Common Object Request-Broker Architecture (CORBA); however this architecture is not suitable for the Internet which uses HyperText Transfer Protocol (HTTP) to transport data. For example, RPC often presents compatibility and security issues, while most firewalls and proxy servers block RPC transactions.

As an alternative to RPC, a consortium of technology corporations developed and proposed to W3C, the Simple Object Access Protocol (SOAP) Internet protocol. The SOAP protocol simplifies application development by connecting graphic user interface desktop applications to powerful Internet servers using the standards of the Internet, namely HTTP and XML. SOAP is generally known as the preferred protocol for exchanging web services. Specifically, SOAP defines an envelope format and various rules for describing its contents. A SOAP message is an ordinary XML document which contains four primary elements, the envelope that identifies the XML document as a SOAP message; an optional Header element containing application specific information; a Body element containing call and response information; and, an optional Fault element providing information about errors that occur during message processing.

SOAP, in its current form, only defines one internal block which is the Fault block that can appear in the Body element. Without a standard structure to leverage, developers of components are forced to create their own message structure and create individual solutions to bridge multiple technologies and provide linkages to enterprise messaging infrastructure (EMI) infrastructure capabilities. Additionally, the time to deploy and maintenance costs within the EMI are driven up as each of these solutions includes unique handling logic.

Therefore, a need exists for a system and method for defining an expanded message envelope incorporating a number of standard header blocks, wherein each block is defined to store the data needed for a specific common infrastructure capability found within an entity's EMI.

SUMMARY OF INVENTION

A system and method for defining a standard envelope structure for components to use for their service messages. In one embodiment, the envelope structure includes several header data blocks, wherein each block is defined to meet the needs of a specific infrastructure capability common to component messaging. The envelope structure also defines two body data blocks as a general framework for the service to use when accepting or returning business data. The message structure and its blocks provide a framework for physical transformations of messages, allowing components to be loosely coupled across a heterogeneous technology environment. The message structure provides a single framework that every component project can leverage, thereby reducing development time. This framework advances a single solution to the challenges of multiple technologies and a common system and method of linking to EMI infrastructure capabilities. A single framework allows a standard set of handling logic to be implemented within the EMI, reducing deployment time and maintenance costs. Without a standard framework, these transformations may not be handled in a uniform manner. The system and method is particularly beneficial with the adoption of adaptive architecture approaches emphasizing component-based and message-oriented solutions.

The system and method include a specific solution to coupling infrastructure capabilities within a message between the two principal components and a solution for transformational elements. The EMI message structure may be considered an adaptation of some Web Service standards to an Enterprise Application Integration (EAI) solution with specific focus on solving common infrastructure capability needs. The single message structure pattern leads to a more consistent, higher quality, lower cost service environment. The message structure also helps to standardize how corporations create services, which results in more consistent deliverables with decreased development time, development cost, and overall project risk.

In one embodiment, the message structure is an extension and adaptation of a basic messaging protocol as specified by the W3C SOAP 1.1 Specification, which is incorporated by reference. SOAP simply specified a message as an envelope consisting of an optional header and a body, wherein the messages are sent using the HTTP transport protocol. SOAP only defined one internal block, namely a fault block that could appear within the body. The message structure defines two standard body blocks, namely a request and a response. These blocks are only patterns, but still provide development time savings to each component's development team. The message structure also answers a technology challenge, allowing components to be loosely coupled despite having different technologies at play at the individual endpoints. The standard Header blocks provide a place to preserve data when transformations occur, while moving between transport protocols (e.g., HTTP or MQ) or converting the message language (e.g., between COBOL- or another fixed-format language—and XML).

More particularly, the method facilitates creating a standard envelope structure with defined data blocks by, for example, creating a first request message within a first programming language; creating a request mark-up language envelope from the first request message; converting the request mark-up language envelope to a second request message within a second programming language; processing the second request message; creating a response message within a second programming language, wherein the response message is based upon the results of the processing of the second request message; and, creating a response mark-up language envelope from the response message. Creating a response message within a second programming language includes, for example: creating a first response message within a second programming language; creating a response mark-up language envelope from the first response message; converting the response mark-up language envelope to a second response message within a first programming language; and, processing the second response message.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and objects of the individual operating objects of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the system and method defines a standard message envelope structure for objects to use for transmitting and receiving service related messages. The envelope structure includes several data blocks, wherein each is defined to meet the needs of specific infrastructure capability common to component messaging. The envelope structure further defines two data blocks which serve as a general framework for the service to use when accepting and/or returning messages.

Figure 1:
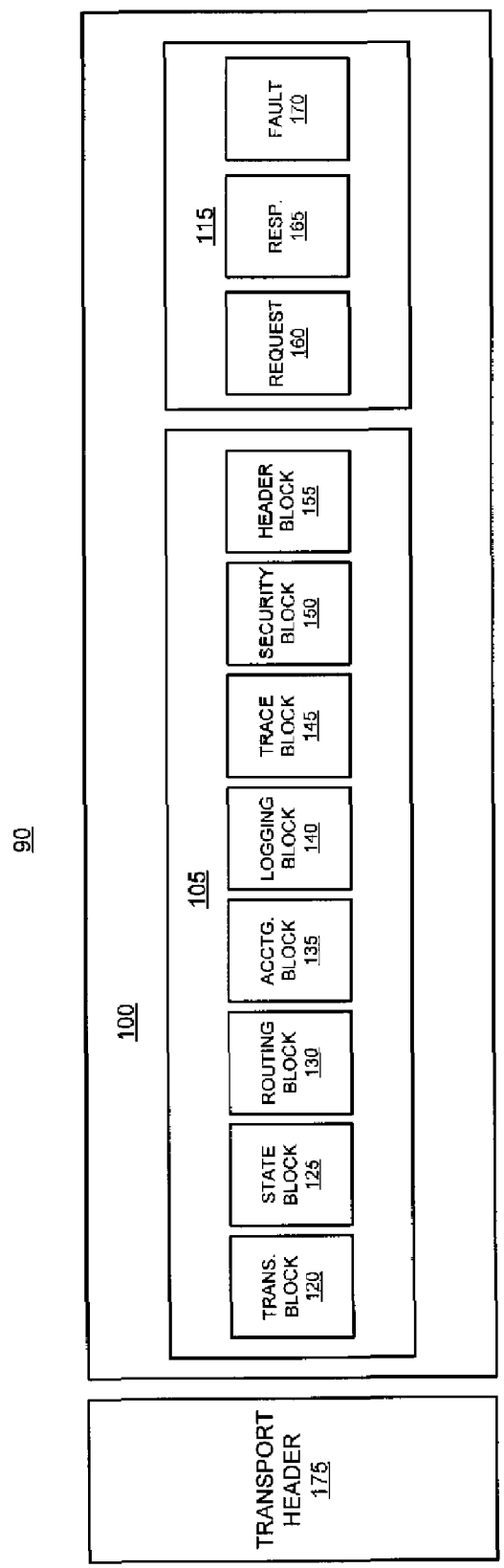
FIG. 1 is a block diagram illustrating an exemplary envelope structure for request, response or fault messages (e.g., input, output or error) within an enterprise messaging infrastructure according to one embodiment of the invention.

FIG. 1 is a block diagram illustrating an exemplary envelope structure for request and response messages 90 within an enterprise messaging infrastructure. The transaction header 120 facilitates transformations between various transport protocols. Transaction header 120 contains elements that originate in one or more transport headers such as, for example, MQMD, HTTP, FTP and the like. The transport header 175 maintains these elements until receiving a message 90 at a protocol boundary, at which time data unique to the protocol is preserved within the transaction block 120 of the message envelope 100. Moreover, the transaction header 120 contains elements which are functional extensions to the EMI and are not defined by any deployed transport protocol. Such elements may include, for example, service level agreements (SLA), service versions, requester specific process control, etc.

Envelope 100 encompasses a header 105 and a body 115 section. Transaction block 120 is used for extended EMI capabilities and for preserving protocol parameters. State block 125 is a mechanism that provides the ability to hold an application specific process control identifier (from the requestor) and correlate all of the messages in the accomplishment of a service, even messages between process (the original service provider) and base components. Routing block 130 is defined to provide a physical return path through the EMI for response messages 90 and is a mechanism to provide service level agreement (SLA) support. Routing block 130 is also used by the EMI to return messages 90 to an initiator's error queue. Routing block 130 is constructed by the logical hubs (application and common service hubs) of the EMI for input messages 90 within the request/responses and fire-and-forget messaging patterns and for output messages 90 within the notify messaging pattern. Routing block 130 is further consumed by the logical hubs of the EMI on output or error messages 90 in the request/response messaging pattern and error messages in the fire-and-forget messaging pattern.

Security block 150 is defined to include a security token within the message envelope 100. This security token designates authentication of a subject (e.g., actor or resource consumer), authorization of a subject and attributes about the subject. In one embodiment, accounting 135, logging 140 and trace 145 block are optional. Accounting 135 is used if work and resources related to the message's processing should be recovered and charged back to the requestor. Logging 140 is used to provide an audit trail for services as appropriate or necessary. Trace 145 is used to help debug enterprise integration problems.

Envelope 100 further comprises a body 115 for maintaining request 160, response 165 and fault 170 body blocks. The request block 160 is a structure configured for input messages initiated by a requestor as part of a request-response messaging pattern or requestor as part of a fire-and-forget messaging pattern. Request 160 is a container for a number of elements commonly used to define the scope of a request (e.g., an identifier or search parameters, option parameters, filter parameters and input data). Response block 165 is a structure configured for output messages initiated by service provider 215 as part of a Request-Response messaging pattern or by service provider 215 as part of a Notify messaging pattern. The response 165 is a container for a number of elements commonly used to define the scope and content of a response (status and output data being sent to the requestor). Fault block 170 is a structure configured for error messages initiated by any service provider that is unable to process a request message.

Figure 2:
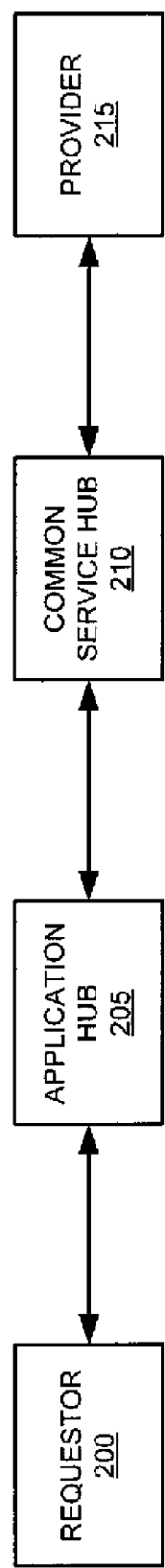
FIG. 2 is a block diagram illustrating an exemplary messaging infrastructure according to one embodiment of the invention.

FIG. 2 is a block diagram illustrating an exemplary messaging infrastructure according to one embodiment of the invention. Requestor 200 includes any individual, business, entity, government organization, software and/or hardware which transmits request messages and receive response messages to and from at least one service supplier. Requestor 200 may be an application or application object that relies on the services of other applications and/or objects to provide computing functionality.

Provider 215 includes any individual, business, entity, government organization, software and/or hardware which receive service requests from a requestor 200. Provider 215 may reside as an application program and/or an application object to receive and process service requests from requestors 200 and transmit a response or error message based on service results.

Requestor 200 and provider 215 components may reside within any device (e.g., computer) which communicates (in any manner discussed herein) with any component via any network discussed herein. Requestor 200 and provider 215 may further comprise locally installed software and/or browser applications providing logic and an interface for interacting with envelope 100. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that requestor 200 and provider 215 may or may not exchange messages directly. For example, requestor 200 may transmit a request message to a provider 215 through any number of objects, which may have a direct or indirect connection to an objects service.

As those skilled in the art will appreciate, requestor 200 and provider 215 computing platforms include an operating system (e.g., Windows NT, 95/98/2000, OS2, UNIX, Linux, Solaris, MacOS, etc.) as well as various conventional support software and drivers typically associated with computers. The requestor 200 and provider 215 computing platforms may include any suitable personal computer, network computer, workstation, minicomputer, mainframe or the like. Requestor 200 and provider 215 computing platforms can be in a home or business environment with access to a network. In an exemplary embodiment, access is through a network or the Internet through a commercially available web-browser software package.

Requestor 200 and provider 215 platforms may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, biometrics, grid computing and/or mesh computing. In one embodiment, requestor 200 and provider 215 may reside within independent computing units or as application objects interacting with other objects and/or applications. Interaction, whether direct or indirect, may invoke a message within an application tier. A message may comprise a request or a response that is passed from a first object in an application tier to a second object in a business tier. "Message" is a term common in object oriented programming referring to the transfer of information, meaningful only to the first object and second object. Receipt of a message usually results in a method invocation within the second object, and a reply message from the second object to the first object. For example, an online banking customer may select a link from the bank's web site to view her savings account balance, thereby invoking an application tier object to create and send a request message. The request message may include parameterized data such as an account number, authentication credentials, and a request for account data. According to existing n-tier software methodology, an object within a business tier receives the message, formulates a database query according to message parameters and passes the query to a data tier where the query is executed. The results are then sent within a message to the business tier object where it is formatted and sent to the application tier within a reply message.

A request message originating at requester 200 is routed to the appropriate one or more hubs for processing and formatting of the message envelope prior to being received by a provider 215 object. As used herein, an object comprises one of more specialized functions and/or methods that may be invoked by any number of applications and/or other objects. For example, a customer object may provide a number of services which can be logically grouped into a single object. A customer object includes methods and/or functions to retrieve customer billing information, obtain account balances, calculate loan payments, etc. These specialized methods and/or are otherwise known as services as will be used accordingly herein.

Services are generally invoked when an object receives a request message. The message contains an object identifier and a service identifier along with any required and/or optional parameters. For example, to invoke a service to retrieve a list of customer names from a database, the message may contain a call to a customer object "Get" service (i.e., GetCustomerName). As a result, the "Get" service is invoked to retrieve customer names and return the results to the client in a response message. This is a very general example, and practitioners will appreciate that there a number of methods and formats for creating messages to invoke services.

Figure 3:
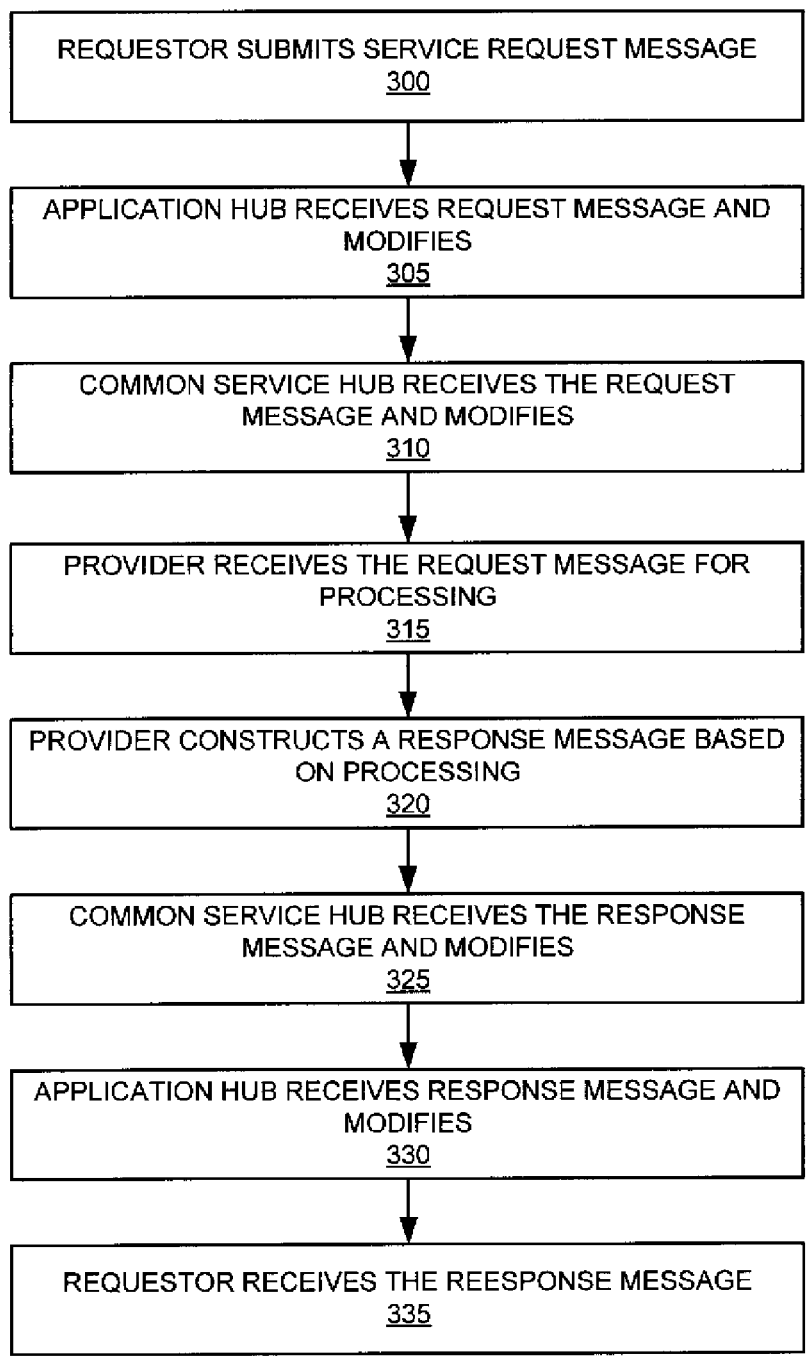
FIG. 3 is a flowchart illustrating an exemplary request and response scenario using an enterprise messaging infrastructure according to one embodiment of the invention.
Figure 4:
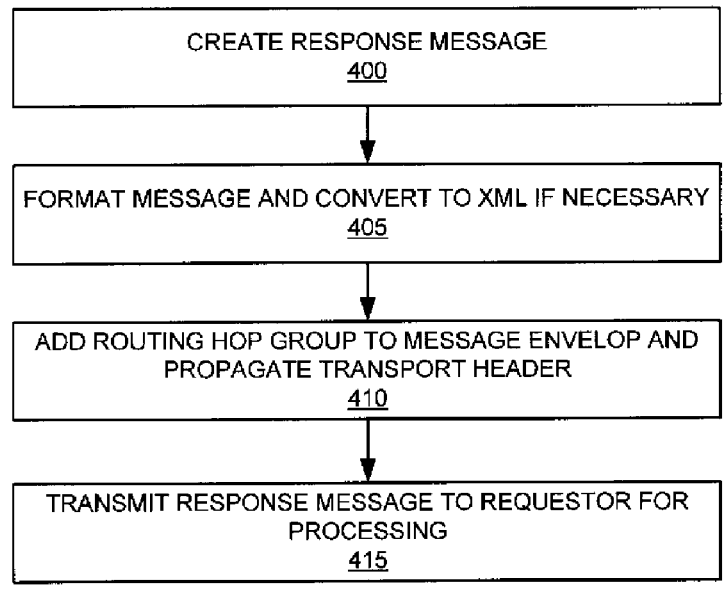
FIG. 4 is a process flowchart illustrating an exemplary one-way response (e.g., notify) scenario using an enterprise messaging infrastructure according to one embodiment of the invention; and, FIG. 5 is a process flowchart illustrating an exemplary one-way request (e.g., fire-and-forget) scenario using an enterprise messaging infrastructure according to one embodiment of the invention.
Figure 5:
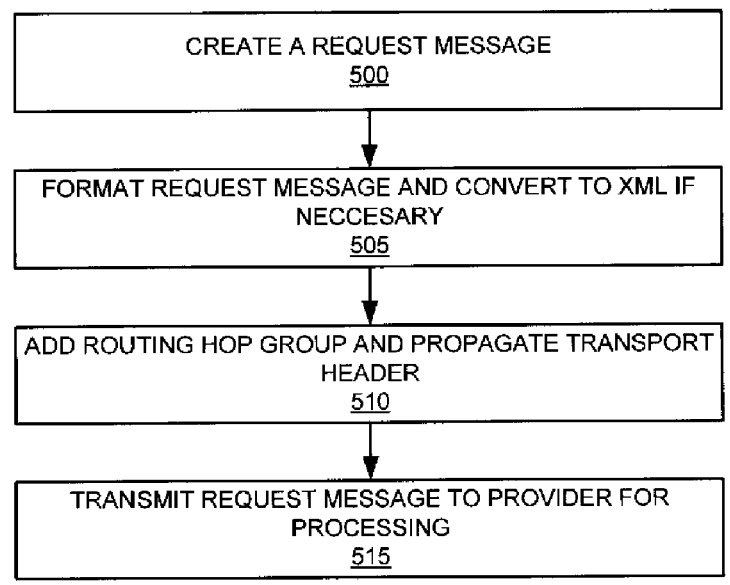

FIGS. 3-5 depict mere embodiments of the construction and processing of the envelope 100 and are not intended to limit the scope of the invention as described herein. For example, the steps recited in any of the process description may be executed in any order and is not limited to the order presented. It will be appreciated that the following description makes appropriate references not only to the steps and user interface elements depicted in FIGS. 3-5, but also to the various system components as described above with reference to FIGS. 1 and 2.

When requester 200 submits a request message (step 300), the request message includes the appropriate transport protocol header 175 when using the transport header 175 which includes the identity of the requester 200 as the originator of the request. If requestor 200 is using the MQRFH2 routing and formatting header (for fixed-format requesters), the transport header 175 may further include the message name as part of the <mcd> folder.

The request message also includes a transaction header block 120 comprising information not already held by the transport header protocol 175 such as, for example, the service name and service version, the message name (for XML messages) and version, the message pattern type and message type, an optional application specific process control id, an optional service level agreement (SLA) time quantity, etc.

The request message further includes a security header block 150 which contains a security token of a resource consumer as either HTTP header elements such as domain, realm, session and Globally Unique Identifier (GUID), or Security Assertion Markup Language (SAML) assertion elements such as authentication, authorization and attribute statements. Accounting 135, Logging 140 and Trace 145 header blocks are optional, and the service interface identifies whether any of these blocks are needed. A request block may be required per a service interface specification.

The application hub 205 receives and modifies request message (step 305) as follows. First, transport header 175 is modified by adding the message ID (generated by the hub 205) as well as any other elements (e.g., timestamp). If the MQRFH2 routing and formatting header is supplied with the request message, then the <mcd> folder data is relocated into the transaction header block elements 120, the MQRFH2 routing and formatting header is dropped and the entire envelope 100 is transformed, in one embodiment, from COBOL to XML.

A routing header block 130 is inserted into the envelope with the first routing hop valued. A state header block 125 is inserted into the envelope 100 and valued by copying the same named elements from the transaction header block 120 and transport header 175. Using a supplied data mapping, request block elements are transformed from the requester's native names to the canonical names.

In one embodiment, the common service hub 210 receives and further modifies the request message (step 310) as follows. The routing header block 130 is first modified by adding the second routing hop group. If the provider 215 requests fixed-format, a MQRFH2 routing and formatting header is constructed and inserted between the transport header 175 and envelope 100. The MQRFH2 routing and formatting header constructs an <mcd> folder from transaction header block 120 elements. Both the transaction 120 and routing header 130 blocks are retained as part of the envelope 100. The entire envelope is then transformed from XML to COBOL. Using a supplied data mapping, request block elements are transformed from the canonical names to the provider's 215 native names.

In one embodiment, upon receiving request message, provider 215 processes the request message (step 315) as follows. First, if provider 215 uses fixed-formats (e.g., COBOL), then the MQRFH2 routing and formatting header is preserved in order to return the MQRFH2 as part of the response or error message. The transaction 120, state 125, routing 130 and security 150 header blocks must be preserved and are returned as part of the response or error message. The request 160 block is processed by the invoked service and if it does not conform to the published service interface specification, the provider 215 returns an error message.

When provider 215 has completed processing of a request message, in one embodiment, it constructs a response message (step 320) using the appropriate transport protocol header. If the request message included a transport header 175, then the MQMD is configured to include the identity of the provider 215 as the originator and the MsgType is set to "reply". If the request message included a MQRFH2, then it is returned as part of a response message. A transaction header block 120 is included and only supplies data not already held by the transport header 175 which is echoed back after changing, the MessageTypeCd to "O", or a change to the CorrelationId using the MsgId from the request's MQMD. State header block 125 is included if it was included in the request or if multiple response messages are being returned or echoed back to the requestor 200. Further, provider 215 inserts Add ReturnMsgCnt and ReturnMsgSeqNbr into the state 125 block. The response message further contains a routing header block 130 which is echoed back after changing the routing direction to the requestor 200. A security header 150 and request blocks are echoed back in the response message unchanged from that of the request message. Accounting 135, logging 140 and trace header 155 blocks are implemented according to the service. Response 165 block is included according to the service interface specification.

In one embodiment, after receiving the response message, common service hub 210 modifies the request message (step 325) by adding the Message Id (generated by hub 210) and other elements (e.g., timestamp) to the response message. If a MQRFH2 routing and formatting header was supplied (e.g., for fixed-format), it will be dropped and the entire envelope is transformed from COBOL to XML and state header block 125 is modified by adding the ReturnMsgId using the Message Id from the transport header 175. The routing header block 130 is modified by calculating a SrvcResponseTimeQty for the second routing hop group. Using a supplied data mapping, request and response block elements are transformed to the canonical names from the provider's native names.

When the application hub 205 receives the response message (step 330), routing header block 130 is modified by calculating a SrvcResponseTimeQty for the first routing hop group. Transaction header block 120 is modified by adding the SrvcResponseTimeQty from the first routing hop group. If the requester desires a fixed format, a MQRFH2 routing and formatting header is constructed and inserted between the MQMD 175 and envelope 100. The MQRFH2 routing and formatting header constructs the <mcd> folder from transaction header block 120 elements and is retained as part of the envelope. The entire envelope 100 is then transformed to COBOL from XML. Using a supplied data mapping, request and response block elements are transformed to the provider's native names from the canonical names.

When requester 200 receives the response message (step 335), in one embodiment, the appropriate transport protocol header 175 is included. When using transport header 175, the CorrelationId may be used to identify the original request message corresponding to the response message. Transaction header block 120 is included and supplies data not already held by transport protocol header 175. Such information may include, for example, the service name and service version, the message name (for XML messages) and version, the message pattern type and message type and the like.

State header block 125 may be included within the response message, but is not required. State header block 125 maintains the ProcessControlId that was specified in the request message as well as ReturnMsgCnt and ReturnMsgSeqNbr. The response message also includes routing header block 130 to maintain response times relating to each hub. Security header block 150 contains a security token of the consumer as either HTTP header elements (domain, realm, session, GUID) or SAML Assertion (authentication, authorization, attribute statements).

FIG. 4 is a process flowchart illustrating an exemplary provider notification response scenario using an enterprise messaging infrastructure. Some transactions are not bidirectional in nature and do not require a response from the receiving entity (i.e., requester, provider). If the one-way message originates at the provider, then it is referred to as a notification response message. If the message originates at the requester, it is referred to as a one-way request message or a "fire and forget" message, which will be discussed in greater detail in reference to FIG. 5.

A notification response message typically involves four sets of primary actions being executed against a single message. When provider 215 creates a response message (step 400), the message is received by common service hub 210 which formats the message (step 405). If the message originator (provider 215) uses a fixed format (e.g., COBOL), then common service hub 210 converts the message envelope to XML and eliminates the MQRFH2 routing and formatting header. Further, common service hub 210 also constructs a routing block 130, adds a routing hop group, propagates transport header 175 and constructs a state block 125. If provider 215 uses native data names, the common service hub 210 converts the body 115 to canonical data names.

The formatted response message is then transmitted to application hub (step 410) where a routing hop group is added to the message envelope. Again, transport header 175 is propagated. If the destination component (requestor 200) uses fixed format, then application hub 205 constructs MQRFH2 routing and formatting header and converts the envelope from XML to a format readable by requester 200. If the destination component uses native data names, then the body is converted to canonical data names. Finally, application hub 205 transmits the response message to requester (step 415) where it is processed.

FIG. 5 is a process flowchart illustrating an exemplary requester one way request scenario using an enterprise messaging infrastructure. The requester 200 creates a request (step 500) and first transmits it to the application hub 205 for formatting (step 505). If requester 200 uses a fixed format (e.g., COBOL), then application hub 205 converts the envelope to XML and eliminates the MQRFH2 routing and formatting header. Application hub 205 constructs the routing block 130, adds a routing hop group, propagates transport header 175 and constructs the state block 125. If requester 200 uses native data names, then the body 115 is converted to canonical data names. The message is then transmitted to the common service hub.

The common service hub 210 adds a routing hop group and propagates transport header 175 (step 510). If the destination component (provider 215) uses fixed format (e.g., COBOL), then common service hub 210 builds the MQRFH2 routing and formatting header and converts the envelope to XML. If the destination component uses native data names, then the body 115 is converted to canonical data names. The request message is finally transmitted to the provider for processing (step 515).

While the steps outlined above represent an embodiment of the invention, practitioners will appreciate that there are any number of computing algorithms that may be applied to create similar results. The steps are presented for the sake of explanation only and are not intended to limit the scope of the invention in any way. Moreover, any of the steps may be performed partially or in full.

One skilled in the art will appreciate that the invention may further employ any number of databases in any number of configurations for the storage and retrieval of data by services. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the invention by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other objects of the invention may consist of any combination thereof at a single location or at multiple locations, wherein each database or system includes any of various suitable security features, such as firewalls, access codes, encryption, decryption, compression, decompression, and/or the like.

The various system objects discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which incorporates both hardware and software objects of such. Communication among the parties in accordance with the invention may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system objects may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, biometrics, grid computing and/or mesh computing.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, objects such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

The invention may be described herein in terms of functional block objects, screen shots, optional selections and various processing steps. It should be appreciated that such functional blocks may be realized by any number of hardware and/or software objects configured to perform the specified functions. For example, the invention may employ various integrated circuit objects, e.g., memory elements, processing elements, logic elements, look-up tables, and the like, which may carry out a variety of functions under the control of one or more microprocessors or other control devices. Similarly, the software elements of the invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley and Sons (second edition, 1995); (2) "Java Cryptography" by Jonathan Knudson, published by O'Reilly and Associates (1998); (3) "Cryptography and Network Security: Principles and Practice" by William Stallings, published by Prentice Hall; all of which are hereby incorporated by reference.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method for creating an envelope structure with defined data blocks within a request-response messaging pattern, said method including:

creating a first request message within a first programming language;

creating a request mark-up language envelope from said first request message by:

creating a transaction block for maintaining transport protocol parameters;

maintaining said transport protocol parameters within said transaction block during component message processing;

creating a state block for maintaining an application specific process control identifier;

maintaining said application specific process control identifier within said state block during said component message processing;

creating a routing block for maintaining a response message return path;

maintaining said response message return path within said routing block during said component message processing;

creating an accounting block for maintaining processing costs to be charged to a requester;

maintaining said processing costs within said accounting block during said component message processing;

creating a logging block for maintaining an audit trail provided to said requestor;

maintaining said audit trail within said logging block during said component message processing;

creating a trace block for maintaining error information;

maintaining said error information within said trace block during said component message processing;

creating a security block for maintaining a security token designating authentication of said requester; and maintaining said security token designating authentication within said security block during said component message processing;

converting said request mark-up language envelope to a second request message within a second programming language;

processing said second request message;

creating a first response message within said second programming language, wherein said first response message is based upon results of said processing of said second request message;

creating a response mark-up language envelope from said first response message;

converting said response mark-up language envelope to a second response message within said first programming language; and, processing said second response message.

2. The method of claim 1, further including transmitting said request mark-up language envelope to a provider.

3. The method of claim 1, further including transmitting said response mark-up language envelope to a requester.

4. The method of claim 1, wherein said step of creating a request mark-up language envelope includes creating a request XML envelope.

5. The method of claim 1, wherein said step of creating a response mark-up language envelope includes creating a response XML envelope.

6. The method of claim 1, wherein said step of creating a request mark-up language envelope includes creating a request mark-up language envelope in a fixed format.

7. The method of claim 1, wherein said step of creating a response mark-up language envelope includes creating a request mark-up language envelope in a fixed format.

8. The method of claim 1, wherein said step of creating a request mark-up language envelope includes a transformation between a native data name and canonical data name.

9. The method of claim 1, wherein said step of creating a response mark-up language envelope includes a transformation between a native data name and a canonical data name.

10. The method of claim 1, wherein said step of converting a request mark-up language envelope includes a transformation between a native data name and a canonical data name.

11. The method of claim 1, wherein said step of converting a response mark-up language envelope includes a transformations between a native data name and a canonical data name.

12. The method of claim 1, wherein said step of creating a request mark-up language envelope includes creating a header section and a body section.

13. The method of claim 1, wherein said step of creating a request mark-up language envelope includes creating a header section comprising said transaction block, said routing block, said state block, and at least one of said accounting block, said logging block, said trace block and said security block.

14. The method of claim 1, wherein said step of creating a request mark-up language envelope includes creating a body section holding a request block.

15. The method of claim 1, wherein said step of creating a response mark-up language envelope includes creating a header section and a body section.

16. The method of claim 1, wherein said step of creating a response mark-up language envelope includes creating a header section comprising said transaction block, said routing block, said state block, and at least one of said accounting block, said logging block, said trace block and said security block.

17. The method of claim 1, wherein said step of creating a response mark-up language envelope includes creating a body section holding a response block.

18. The method of claim 1, wherein said step of creating a request mark-up language envelope includes preserving data from transport protocol headers within the transaction block.

19. The method of claim 1, wherein said step of converting a request mark-up language envelope includes creating transport protocol headers from data within the transaction block.

20. The method of claim 1, wherein said step of creating a request mark-up language envelope includes creating a routing block having a routing hop group.

21. The method of claim 1, wherein said step of converting a request mark-up language envelope includes updating a routing block by adding a routing hop group.

22. The method of claim 1, wherein said step of creating a response mark-up language envelope includes updating a second routing hop group of a routing block.

23. The method of claim 1, wherein said step of converting a response mark-up language envelope includes updating a first routing hop group of a routing block.

24. A method for creating an envelope structure with defined data blocks within a notify messaging pattern, said method including:

creating a first response message within a first programming language;

creating a response mark-up language envelope from said first response message by:

creating a transaction block for maintaining transport protocol parameters;

maintaining said transport protocol parameters within said transaction block during component message processing;

creating a state block for maintaining an application specific process control identifier;

maintaining said application specific process control identifier within said state block during said component message processing;

creating a routing block for maintaining a response message return path;
maintaining said response message return path within said routing block during said component message processing;
creating an accounting block for maintaining processing costs to be charged to a requestor;
maintaining said processing costs within said accounting block during said component message processing;
creating a logging block for maintaining an audit trail provided to said requester;
maintaining said audit trail within said logging block during said component message processing;
creating a trace block for maintaining error information;
maintaining said error information within said trace block during said component message processing;
creating a security block for maintaining a security token designating authentication of said requestor; and
maintaining said security token designating authentication within said security block during said component message processing;
converting said response mark-up language envelope to a second response message within a second programming language; and,
processing said second response message.

25. The method of claim 24, further including transmitting said response mark-up language envelope to a requestor.

26. The method of claim 24, wherein said step of creating a response mark-up language envelope includes creating a response XML envelope.

27. The method of claim 24, wherein said step of creating a response mark-up language envelope includes creating a request mark-up language envelope in a fixed format.

28. The method of claim 24, wherein said step of creating a response mark-up language envelope includes a transformation between a native data name and a canonical data name.

29. The method of claim 24, wherein said step of converting a response mark-up language envelope includes a transformation between a native data name and a canonical data name.

30. The method of claim 24, wherein said step of creating a response mark-up language envelope includes creating a header section and a body section.

31. The method of claim 24, wherein said step of creating a response mark-up language envelope includes creating a header section comprising said transaction block, said routing block, said state block, and at least one of said accounting block, said logging block, said trace block and said security block.

32. The method of claim 24, wherein said step of creating a response mark-up language envelope includes creating a body section holding said response block.

33. The method of claim 24, wherein said step of creating a response mark-up language envelope includes preserving data from transport protocol headers within said transaction block.

34. The method of claim 24, wherein said a routing block includes a routing hop group.

35. The method of claim 24, wherein said step of converting a request mark-up language envelope includes updating said routing block by adding a routing hop group.

36. A method for creating an envelope structure with defined data blocks within a fire-and-forget messaging pattern, said method including:
creating a first request message within a first programming language;
creating a request mark-up language envelope from said first request message by:
creating a transaction block for maintaining transport protocol parameters;
maintaining said transport protocol parameters within said transaction block during component message processing;
creating a state block for maintaining an application specific process control identifier;
maintaining said application specific process control identifier within said state block during said component message processing;
creating a routing block for maintaining a response message return path;
maintaining said response message return path within said routing block during said component message processing;
creating an accounting block for maintaining processing costs to be charged to a requester;
maintaining said processing costs within said accounting block during said component message processing;
creating a logging block for maintaining an audit trail provided to said requestor;
maintaining said audit trail within said logging block during said component message processing;
creating a trace block for maintaining error information;
maintaining said error information within said trace block during said component message processing;
creating a security block for maintaining a security token designating authentication of said requestor; and
maintaining said security token designating authentication within said security block during said component message processing;
converting said request mark-up language envelope to a second request message within a second programming language; and,
processing said second request message.

37. The method of claim 36, further including transmitting said request mark-up language envelope to a provider.

38. The method of claim 36, wherein said step of creating a request mark-up language envelope includes creating a request XML envelope.

39. The method of claim 36, wherein said step of creating a request mark-up language envelope includes creating a request mark-up language envelope in a fixed format.

40. The method of claim 36, wherein said step of creating a request mark-up language envelope includes a transformation between a native data name and a canonical data name.

41. The method of claim 36, wherein said step of converting a request mark-up language envelope includes a transformation between a native data name and a canonical data name.

42. The method of claim 36, wherein said step of creating a request mark-up language envelope includes creating a header section and a body section.

43. The method of claim 36, wherein said step of creating a request mark-up language envelope includes creating a header section comprising said transaction block, said routing block, said state block, and at least one of said accounting block, said logging block, said trace block and said security block.

19

44. The method of claim 36, wherein said step of creating a request mark-up language envelope includes creating a body section holding said request block.

45. The method of claim 36, wherein said step of converting a request mark-up language envelope includes creating transport protocol headers from data within said transaction block.

46. The method of claim 36, wherein said routing block includes a routing hop group.

47. The method of claim 36, wherein said step of converting a request mark-up language envelope includes updating said routing block by adding a routing hop group.

48. A computer-readable medium having stored thereon a plurality of instructions comprising:
- instructions to create a first request message within a first programming language;
- instructions to create a request mark-up language envelope from said first request message by using:
    - instructions to create a transaction block for maintaining transport protocol parameters;
    - instructions to maintain said transport protocol parameters within said transaction block during component message processing;
    - instructions to create a state block for maintaining an application specific process control identifier;
    - instructions to maintain said application specific process control identifier within said state block during said component message processing;
    - instructions to create a routing block for maintaining a response message return path;
    - instructions to maintain said response message return path within said routing block during said component message processing;
    - instructions to create an accounting block for maintaining processing costs to be charged to a requestor;
    - instructions to maintain said processing costs within said accounting block during said component message processing;
    - instructions to create a logging block for maintaining an audit trail provided to said requestor;
    - instructions to maintain said audit trail within said logging block during said component message processing;
    - instructions to create a trace block for maintaining error information;
    - instructions to maintain said error information within said trace block during said component message processing;
    - instructions to create a security block for maintaining a security token designating authentication of said requestor; and
    - instructions to maintain said security token designating authentication within said security block during said component message processing;
- instructions to convert said request mark-up language envelope to a second request message within a second programming language;
- instructions to process said second request message;
- instructions to create a first response message within a second programming language, wherein said first response message is based upon said step of processing said second request message;
- instructions to create a first response mark-up language envelope from said first response message;
- instructions to convert said first response mark-up language envelope to a second response message within said first programming language; and,

20

- instructions to process said second response message.

49. A computer-readable medium having stored thereon a plurality of instructions comprising:
- instructions to create a first response message within a first programming language;
- instructions to create a response mark-up language envelope from said first response message by using:
    - instructions to create a transaction block for maintaining transport protocol parameters;
    - instructions to maintain said transport protocol parameters within said transaction block during component message processing;
    - instructions to create a state block for maintaining an application specific process control identifier;
    - instructions to maintain said application specific process control identifier within said state block during said component message processing;
    - instructions to create a routing block for maintaining a response message return path;
    - instructions to maintain said response message return path within said routing block during said component message processing;
    - instructions to create an accounting block for maintaining processing costs to be charged to a requester;
    - instructions to maintain said processing costs within said accounting block during said component message processing;
    - instructions to create a logging block for maintaining an audit trail provided to said requestor;
    - instructions to maintain said audit trail within said logging block during said component message processing;
    - instructions to create a trace block for maintaining error information;
    - instructions to maintain said error information within said trace block during said component message processing;
    - instructions to create a security block for maintaining a security token designating authentication of said requester; and
    - instructions to maintain said security token designating authentication within said security block during said component message processing;
- instructions to convert said response mark-up language envelope to a second response message within a second programming language, and;
- instructions to process said second response message.

50. A computer-readable medium having stored thereon a plurality of instructions comprising:
- instructions to create a first request message within a first programming language;
- instructions to create a request mark-up language envelope from said first request message by using:
    - instructions to create a transaction block for maintaining transport protocol parameters;
    - instructions to maintain said transport protocol parameters within said transaction block during component message processing;
    - instructions to create a state block for maintaining an application specific process control identifier;
    - instructions to maintain said application specific process control identifier within said state block during said component message processing;
    - instructions to create a routing block for maintaining a response message return path;

instructions to maintain said response message return path within said routing block during said component message processing;

instructions to create an accounting block for maintaining processing costs to be charged to a requestor;

instructions to maintain said processing costs within said accounting block during said component message processing;

instructions to create a logging block for maintaining an audit trail provided to said requestor;

instructions to maintain said audit trail within said logging block during said component message processing;

instructions to create a trace block for maintaining error information;

instructions to maintain said error information within said trace block during said component message processing;

instructions to create a security block for maintaining a security token designating authentication of said requester; and instructions to maintain said security token designating authentication within said security block during said component message processing;

instructions to convert said request mark-up language envelope to a second request message within a second programming language, and;

instructions to process said second request message.

\* \* \* \* \*